United States Patent [19]

Ives et al.

[11] 3,996,554
[45] Dec. 7, 1976

[54] DATA TRANSMISSION SYSTEM

[75] Inventors: Andrew Peter Ives, Knowle; Duncan Barry Hodgson, Whitnash, both of England

[73] Assignee: Joseph Lucas (Industries) Limited, Birmingham, England

[22] Filed: Mar. 19, 1974

[21] Appl. No.: 452,653

[30] Foreign Application Priority Data

Apr. 26, 1973 United Kingdom ............. 19825/73

[52] U.S. Cl. .............................. 340/33; 340/31 R; 343/228
[51] Int. Cl.² ......................................... G06G 1/00
[58] Field of Search ............. 340/33, 31; 179/1 SM; 343/225–228; 178/DIG. 3; 325/53, 66, 311, 6, 308

[56] References Cited
UNITED STATES PATENTS

| | | | |
|---|---|---|---|
| 3,376,509 | 4/1968 | Willcox et al. ...................... | 325/53 |
| 3,383,595 | 5/1968 | Obata ................................. | 325/311 |
| 3,673,560 | 6/1972 | Barsh et al. ......................... | 340/33 |
| 3,694,811 | 9/1972 | Wood ............................. | 179/1 SM |
| 3,710,313 | 1/1973 | Kimball et al. ...................... | 340/33 |
| 3,784,970 | 1/1974 | Simpkin ............................. | 340/33 |
| 3,803,358 | 4/1974 | Schirf et al. ..................... | 179/1 SM |

*Primary Examiner*—Marshall M. Curtis
*Attorney, Agent, or Firm*—Finnegan, Henderson, Farabow & Garrett

[57] ABSTRACT

A data transmission system for a road vehicle has an aerial on the road vehicle for picking up signals from an external transmitter. This aerial passes a signal to a receiver on the vehicle which in turn passes the information to a memory unit which stores the information at a fast rate and then supplies the information at a slow rate to an electrical voice synthesizer.

2 Claims, 2 Drawing Figures

DATA TRANSMISSION SYSTEM

This invention relates to a data transmission system and has as its object the provision of such a system in a convenient form.

In accordance with the present invention there is provided a data transmission system comprising a receiver mounted on a road vehicle, aerial coupled to the receiver for receiving information from an external transmitter, a memory unit connected electrically to said receiver for storing data received by the aerial at a relatively fast rate, and an electrical voice synthesizer to which said stored data is fed at a relatively slow rate and which is responsive to said data to give oral information to the driver of the road vehicle.

An electrical voice synthesizer is a piece of electrical apparatus which models the human voice mechanism, and which when electrically stimulated produces intelligible sounds similar to those produced by the human. The expression does not include tape recorders or record players.

Figure 1:
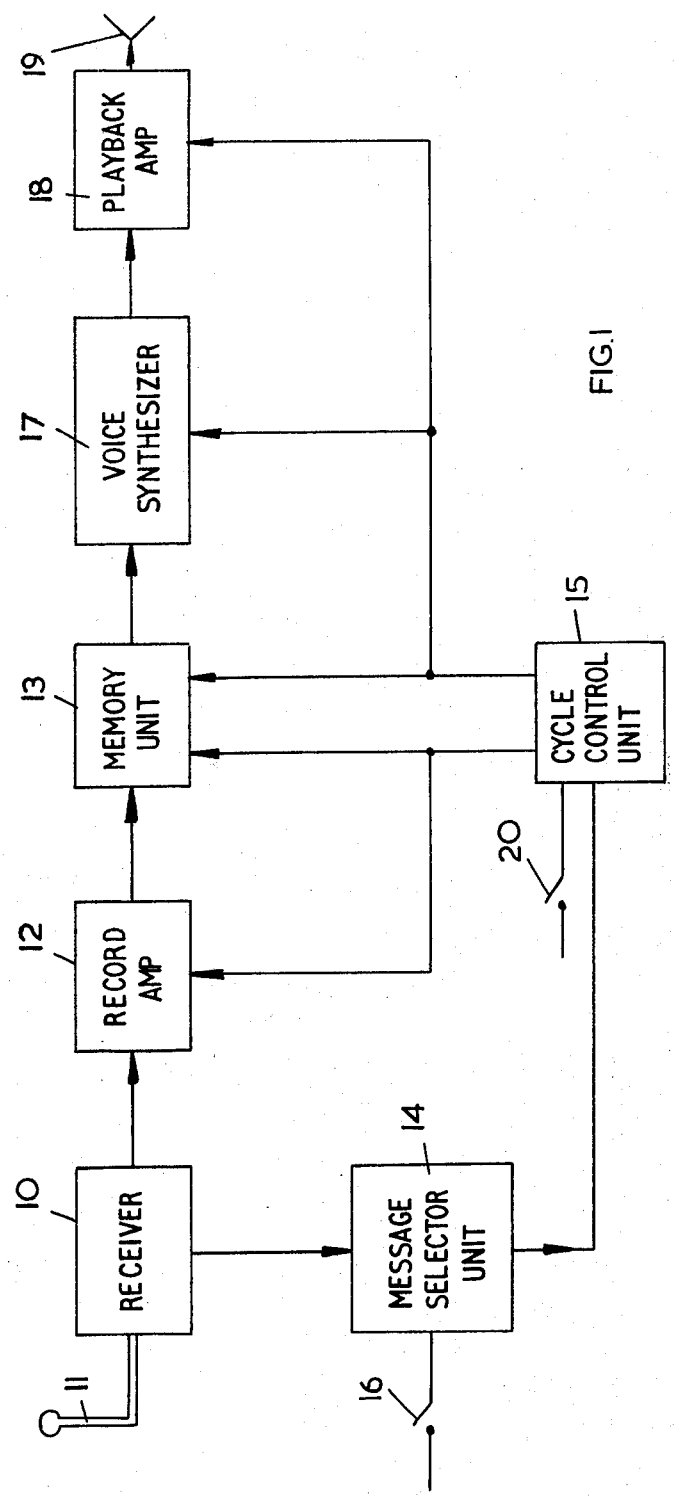
Figure 2:
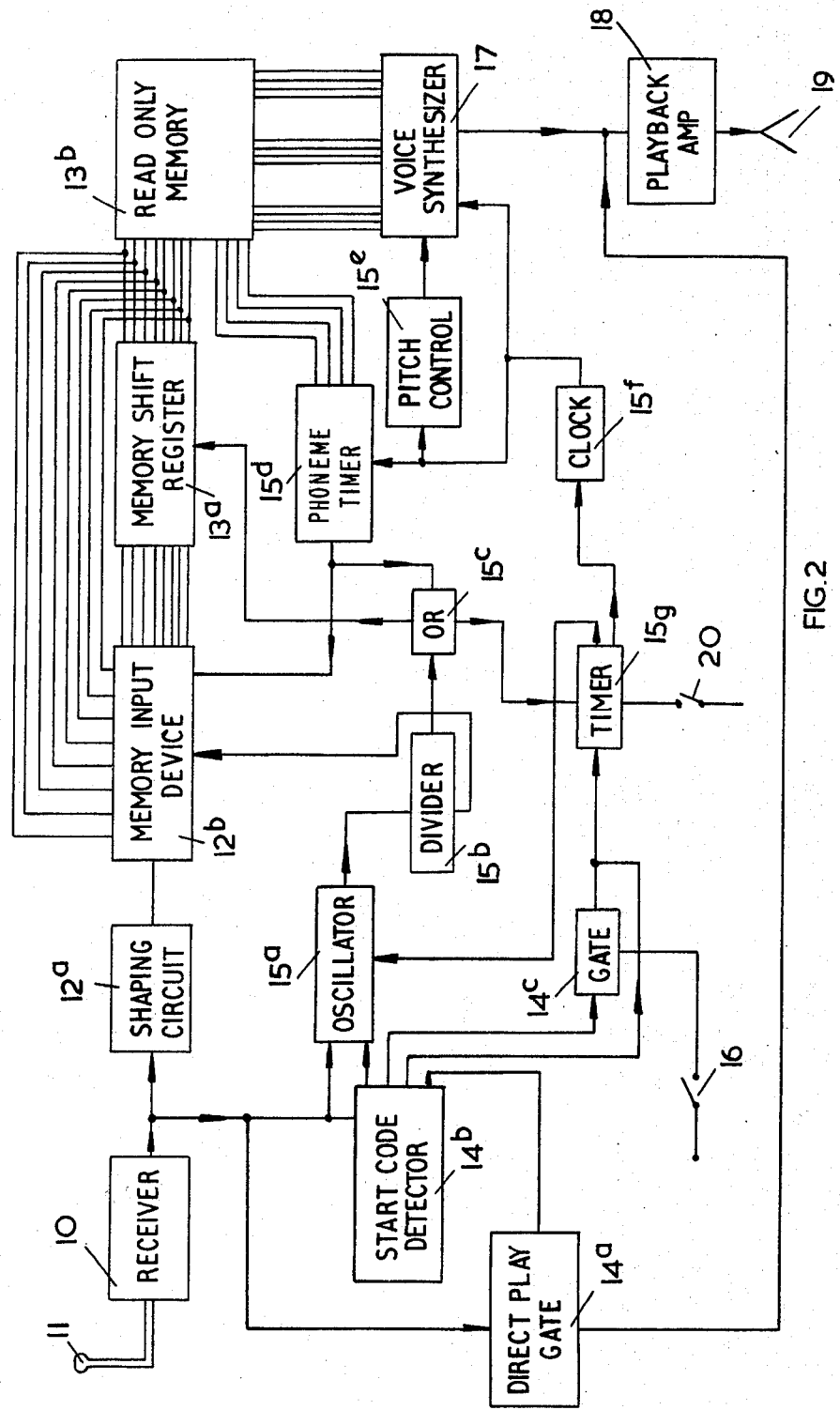

In the accompanying drawings,

FIG. 1 is a block circuit diagram illustrating one embodiment of a data transmission system constructed in accordance with the present invention, and FIG. 2 is a block diagram illustrating the same example in more detail.

Referring to FIG. 1, there is shown therein a receiving end of a data transmission system. The receiving end is mounted on a road vehicle and comprises a receiver 10 having an associated aerial 11 for receiving digital data from an inductive loop transmitter mounted on or buried in a road along which the road vehicle is travelling. The receiver 10 is connected through an amplifier 12 to a memory unit 13 which takes the form of a solid state store. The receiver 10 is also connected through a message selector unit 14 to a cycle control unit 15. The message selector unit 14 has an associated manually operable switch 16 which can be opened by the driver of a road vehicle if he only desires to receive emergency information. Thus, each message code signal received by the receiver 10 is preceded by a start code to denote the beginning of this message and moreover, a different code precedes an emergency message code signal so that if the switch 16 is open, the message selector unit 14 will respond to the start code preceding an emergency message code signal to initiate operation of a cycle control unit 15 which initially feeds a demand signal to the amplifier 12 and the memory unit 13 ordering the latter to record the message code signal being received at the receiver 10. However, if the switch 16 is open and the receiver 10 receives a message prefixed by a non-emergency message start code then the message selector unit 14 does not respond to this code and the cycle control unit 15 inhibits recording of the message code signal received by the receiver 10 in the memory unit 13. If the switch 16 is closed then the message selector unit 14 will respond to both types of start code and will initiate operation of the cycle control unit 15. Alternatively, non-urgent messages can be recorded but not fed to the synthesizer unless the driver wishes.

The inductive loop transmitter (not shown) is of such a length along the road that for maximum road vehicle speed in that particular sector of the road, the transmitter will transmit a message at least twice so that a complete message will always be received by the receiver 10. The second start code received by the receiver 10 from any one transmitter operates the cycle control unit 15 which in turn temporarily inhibits further recording by the memory unit 13 and at the same time causes the memory unit 13 to feed the information stored therein through a voice synthesizer and an amplifier 18 to a speaker 19 so that the information is presented to the driver in oral form.

Finally, the cycle control unit 15 has associated therewith a further manually operable switch 20 which can be operated by the driver of a road vehicle at any time to re-play a message recorded in the memory unit 13. The above described data transmission system possesses the advantage that data can be fed to the memory unit 13 at a substantially faster rate than that at which it is re-played through the voice synthesizer 17. Thus, if the rate of transmitting the data between the inductive loop transmitter and the receiver 10 is 100 times greater than the rate at which the data stored in the memory unit 13 is re-played through the voice synthesizer 17, then the inductive loop transmitter need only possess a physical length of approximately 10 meters in order to transmit twice over to a road vehicle travelling at approximately 100 m.p.h. a message, which when re-played will last for about 10 seconds.

Moreover, for a typical voice synthesizer the number of bits of information required to produce a 10 second message (at 8 bits/phonem, 6 phonems/word, 3 words/second) is 1,540. It will be appreciated that only a relatively small memory unit will be required to store this amount of information.

Road side equipment associated with each inductive loop transmitter may take any one of several forms. One such form of road side equipment could include local storage of all messages which one might wish to transmit to a road vehicle travelling along that particular section of a road, and means for selecting a message to be transmitted, by either remote or manual means.

In an alternative form, the road side equipment may possess no message storage, but instead a loop power driving amplifier wherein each power amplifier receives a signal from a multiplexed line and possesses means for extracting the message addressed to that particular power amplifier and associated inductive loop transmitter. Message storage and means for selecting a desired message would then take place at a central control centre.

As yet a further alternative, the road side equipment may take the form of a temporary solid state storage installation wherein each installation has a "telephone number" or "address". The road side equipment would then be addressed from a central control centre and the message fed into the temporary store from where it is transmitted to the inductive loop transmitter. The advantage of this installation is that a large number of road side equipments can be controlled from a single pair of wires.

The hereinbefore described data transmission system can be used to transmit messages to a driver indicating when a hazard is present or in addition could be used to transmit messages carrying particular information to the driver as, for instance, to the location of the nearest ameneties or to the provision of route information. It is to be appreciated that the transmitter could transmit messages in different languages and the receiving end of the data transmission system could be pre-set to receive a message in the certain language by pre-selecting a certain start code which precedes each message.

Also real time transmission, that is to say direct transmission of information to the driver without the use of the memory unit, could be used in low vehicle speed areas such as car parks by pre-selecting a certain start code.

Furthermore, temporary loops can readily be laid on a road by Local Authorities to warn drivers of temporary hazards. Other transmitters can be used, for example a leaky co-axial cable at side of road, a local radio beacon or beamed microwaves.

The actual blocks shown in FIG. 1 are known in themselves, but in some cases may consist of a combination of known blocks, as indicated by the arrangement of FIG. 2. In FIG. 2, the unit 14, the amplifier 12, the unit 13 and the unit 15 are shown in more detail, the components making up the three units and amplifier being indicated by the same reference numerals with suffixes. Thus, the message selector unit 14 comprises a start code detector 14b which continually examines the signal from the aerial 11 and receiver 10 until it recognises one of three codes. The first of these codes is the direct play code, and when this signal is received, a direct play gate 14a is operated so that the signal is passed directly to the amplifier 18. The second of these signals is the nonemergency signal which is passed to the remainder of the system by way of a gate 14c controlled by the switch 16. The third signal is the emergency signal which by-passes the gate 14c.

The record amplifier 12 consists of a shaping circuit 12a, and a memory input device 12b. The circuit 12a merely processes the signal from the receiver 10 so that it is in a suitable form to be received by the device 12b. The device 12b has two modes of operation. When recording a new message, it converts the data it receives into suitable data for transmission to the memory unit 13. When a message is being played back, the device 12b makes sure that the information is re-stored, as indicated by the feedback circuit shown from the register 13a to the device 12b.

The memory unit 13 consists of a memory shift register 13a which stores data words presented as its input in the order in which they occur, so that the data appears at the output of the register 13 in the same order as it is received at the input. The register 13a is connected to a read only memory 13b which converts the output data from the register 13 into control data for the voice synthesizer 17 and a phonem timer 15d which forms part of the unit 15.

The unit 15 consists of an oscillator 15a the frequency of which is synchronised to the carrier frequency from the receiver, the frequency being such that the input device 12b receives information at an acceptable rate. The oscillator 15a is connected to a divider network 15b which divides the oscillator frequency by the number of bits in the input word of the memory device 12b so that the memory can store the information. The unit 15 further includes a timer 15g which is coupled to the switch 20 and which controls the duration of the storing time by counting the number of times the memory shift register 13a stores data from the memory input device 12b both during recording and play-back, so that only a complete message is operated on. The timer 15g provides an input to a clock 15f for the voice synthesizer 17, the clock 15f providing a direct input to the synthesizer 17 as well as an input to the synthesizer 17 by way of a pitch control 15e which provides an excitation waveform to the synthesizer 17 to ensure correct operation of the synthesizer 17. The clock 15f also provides an input to a phonem timer 15d which receives information from the memory 13b to determine the duration of a phonem.

We claim:

1. A data transmission system comprising a receiver mounted on a road vehicle, an aerial coupled to the receiver for receiving data signals radiated from an external transmitter having an inductive loop positioned along the path of travel of the road vehicle to enable transmission of data signals to the receiver, a memory unit connected electrically to said receiver for storing data signals received by the aerial at a relatively fast rate, and an electrical voice synthesizer to which said store data signals are fed at a relatively slow rate and which is responsive to said data signals for converting said data signals directly into human voice sounds to give oral information to the driver of the road vehicle.

2. A data transmission system as claimed in claim 1, and in which the transmitter transmits messages preceded by either a normal code or an emergency code, the receiver including a manually operable control and a detector responsive to the transmitted code for operating the memory unit to store a message with a nonemergency code for replay to the driver only upon the actuation of the control and to store a message with an emergency code for replay to the driver regardless of the actuation of the control.

* * * * *